United States Patent
Ofitserov

(10) Patent No.: US 9,195,944 B1
(45) Date of Patent: Nov. 24, 2015

(54) SCORING SITE QUALITY

(71) Applicant: Google Inc., Mountain View, CA (US)

(72) Inventor: Vladimir Ofitserov, Foster City, CA (US)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 13/775,728

(22) Filed: Feb. 25, 2013

Related U.S. Application Data

(60) Provisional application No. 61/602,922, filed on Feb. 24, 2012.

(51) Int. Cl.
- *G06F 17/00* (2006.01)
- *G06N 5/02* (2006.01)
- *G06N 5/04* (2006.01)

(52) U.S. Cl.
CPC ... *G06N 5/04* (2013.01); *G06N 5/02* (2013.01)

(58) Field of Classification Search
None
See application file for complete search history.

(56) References Cited

U.S. PATENT DOCUMENTS

| | | |
|---|---|---|
| 7,603,350 B1 | 10/2009 | Guha |
| 7,797,344 B2 | 9/2010 | Kaul et al. |
| 7,836,050 B2 | 11/2010 | Jing et al. |
| 8,442,984 B1 | 5/2013 | Pennock et al. |
| 8,612,424 B2 | 12/2013 | Dasdan et al. |
| 2002/0078045 A1* | 6/2002 | Dutta .................................. 707/7 |
| 2003/0130982 A1* | 7/2003 | Kasriel et al. ..................... 707/1 |
| 2006/0223495 A1* | 10/2006 | Cassett et al. ................. 455/405 |
| 2009/0037355 A1* | 2/2009 | Brave et al. ..................... 706/45 |

OTHER PUBLICATIONS

"Personalized PageRank for Web Page Prediction Based on Access Time-Length and Frequency" Yong Zhen Guo, Kotagiri Ramamohanarao and Laurence A. F. Park Dept. of Computer Science and Software Engineering, The University of Melbourne 3010, Australia 2007 IEEE/WIC/ACM International Conference on Web Intelligence.*

"Web search behavior of Internet experts and newbies" Christoph Holscher, Gerhard Strube Computer Networks 33 (2000) 337-346 Center for Cognitive Science, Institute for Computer Science and Social Research, University of Freiburg, Freiburg, Germany.*

"Knowledge Discovery from Users Web-Page Navigation" Cyrus Shahabi et al, 1997 IEEE Integrated Media Systems Center and Computer Science Department Los Angeles, California 90089.*

* cited by examiner

*Primary Examiner* — Kakali Chaki
*Assistant Examiner* — Luis Sitiriche
(74) *Attorney, Agent, or Firm* — Fish & Richardson P.C.

(57) ABSTRACT

Methods, systems, and apparatus, including computer programs encoded on computer storage media, for determining site quality scores. In one aspect, a method includes obtaining a plurality of measurements of durations of user visits to resources included in a particular site; and determining a site quality score for the particular site based at least in part on the plurality of measurements, wherein determining the site quality score for the particular site comprises computing a statistical measure from the plurality of measurements.

27 Claims, 2 Drawing Sheets

SCORING SITE QUALITY

CROSS-REFERENCE TO RELATED APPLICATION

This application claims the benefit under 35 U.S.C. §119 (e) of U.S. Patent Application No. 61/602,922, filed Feb. 24, 2012, entitled "Scoring Site Quality", which is incorporated by reference herein in its entirety.

BACKGROUND

This specification relates to ranking search results of search queries submitted to an Internet search engine.

Internet search engines aim to identify resources, e.g., web pages, images, text documents, multimedia content, that are relevant to a user's information needs and to present information about the resources in a manner that is most useful to the user. Internet search engines generally return a set of search results, each identifying a respective resource, in response to a user-submitted query.

SUMMARY

This specification describes how a system can determine a score for a site, e.g., a web site or other collection of data resources, as seen by a search engine, that represents a measure of quality for the site. The score is determined from quantities that are measurements of lengths of time that users spend visiting resources found in particular sites. A site quality score for a particular site can be determined by computing a statistical measure, e.g., a measure of central tendency, from a data set of measurements of durations of user visits to resources found in the particular site. The site quality score for a site can represent a query-independent measure of the usefulness of information included in resources found in the site in answering the informational needs of visitors to those resources. The site quality score for a site can be used as a signal to rank resources, or to rank search results that identify resources, that are found in one site relative to resources found in another site. Alternatively, the site quality score for a site can be used as a signal in determining whether to crawl, refresh, or index a resource found in the site.

In general, one innovative aspect of the subject matter described in this specification can be embodied in methods that include the actions of obtaining a plurality of measurements of durations of user visits to resources included in a particular site; and determining a site quality score for the particular site based at least in part on the plurality of measurements, wherein determining the site quality score for the particular site comprises computing a statistical measure from the plurality of measurements.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. The plurality of measurements can include one or more measurements of a duration of time that elapses between a user clicking on a search result included in a search results web page and the user navigating back to the search results web page, wherein the search result identifies a resource in the particular site. The plurality of measurements can include one or more measurements obtained from user devices that measure the duration of a visit to a resource in the particular site by a user of the user device. The plurality of measurements can include one or more measurements obtained from a network monitoring system that monitors communications by a user device over a network. The plurality of measurements can include one or more measurements obtained from a server that hosts one or more resources. The method can further include: discarding measurements of durations that are below a specified threshold value. The method can further include: adjusting measurements that exceed a pre-determined maximum value to be equal to the maximum value. The statistical measure can be a measure of central tendency of the plurality of measurements. Determining the site quality score can include: obtaining data classifying resources in the particular site into one or more resource types; and adjusting the measurements for a particular resource classified into a particular resource type based on a weight assigned to the particular resource type. Determining the site quality score comprises: obtaining data classifying resources in the particular site into one or more resource types; determining that a proportion of resources in the particular site that are classified into a particular resource type exceeds a threshold proportion; and adjusting the site quality score based on a weight assigned to the particular resource type. The method can further include: discarding measurements that are classified as suspicious by a user model.

The subject matter described in this specification can be implemented in particular embodiments so as to realize one or more of the following advantages. Site quality scores representing a measure of quality for sites, e.g., web sites, can be computed. The site quality scores can represent a query-independent measure of the usefulness of the information available on resources found in the sites. The site quality scores can be used to rank search results according to the web sites in which the resources identified by the results are found. The site quality score for a site can be used as a term in the computation of scores for resources that are in the site. A high site quality score for a particular site can be used to determine how other attributes are used to score resources in that site. Site quality scores can be used in determining whether resources in a site are of sufficiently high quality to be crawled, refreshed, or added to an index of resources by a search engine.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
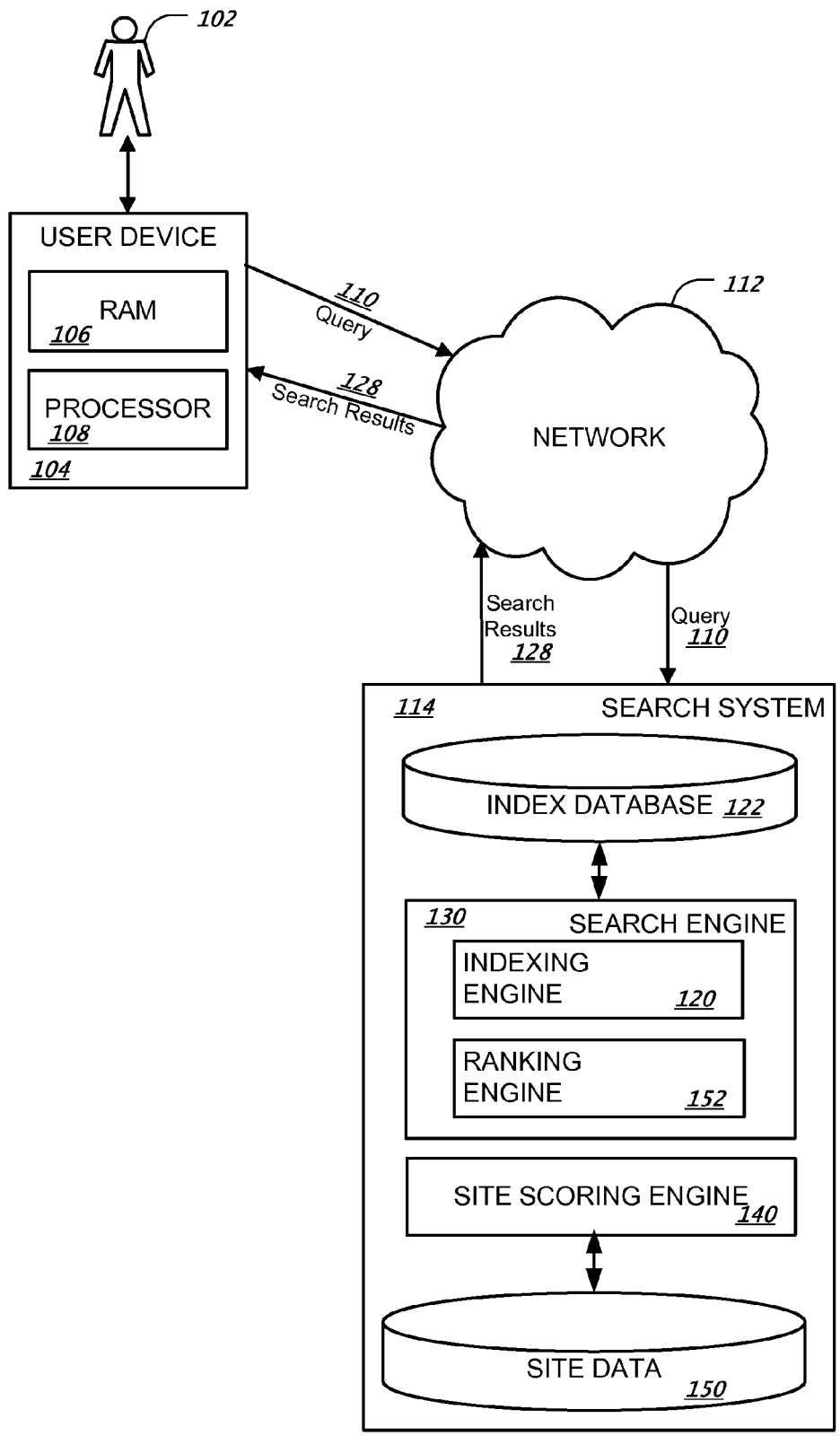
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. For example, the user device 104 can be a computer coupled to the search system 114 through a data communication network 112, e.g., a local area network (LAN) or wide area network (WAN), e.g., the Internet, or a combination of networks. In some cases, the search system 114 can be implemented on the user device 104, for example, if a user installs an application that performs searches on the user device 104. The user device 104 will generally include a memory, e.g., a random access memory (RAM) 106, for storing instructions and data, and a processor 108 for executing stored instructions. The memory can include both read only and writable memory. For example, the user device 104 can be a personal computer of some kind, a cloud client device, a smartphone, or a personal digital assistant. The user device 104 can run an application program, e.g., a web browser, that can interact with the search system 114 to display web pages that provide a user interface to the search system 114 for the user 102 of the user device 104.

A user 102 can use the user device 104 to submit a query 110 to a search system 114. A search engine 130 within the search system 114 performs the search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the user device 104 for presentation to the user 102, e.g., as a search results web page to be displayed by a web browser running on the user device 104.

In this specification, the term "database" will be used broadly to refer to any collection of data: the data does not need to be structured in any particular way, or structured at all, and it can be stored on storage devices in one or more locations. Thus, for example, the index database 122 can include multiple collections of data, each of which may be organized and accessed differently. Similarly, in this specification the term "engine" will be used broadly to refer to a software-based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources on the Internet and uses an index database 122 to store the index information, and a ranking engine 152 or other software that generates scores for the resources that satisfy the query 110 and that ranks the resources according to their respective scores.

The search system 114 can include, and can communicate with, a site scoring engine 140 that can generate site quality scores for sites. The site scoring engine 140 can generate site quality scores based at least in part on site data 150.

Site data 150 includes visit data that characterizes visits to particular resources by users and durations of each of those visits. For example, the visit data can identify clicks by users on search results included in search results web pages, and, for each of the clicks, a measurement of the duration of time that elapsed between the time that the user clicked on the search result and the time that the user navigated back to the search results web page. The system can consider as a click any user action made with respect to a search result that initiates a request for the resource identified by the search result, e.g., a cursor click on a Uniform Resource Locator (URL) of a resource in the search result in a graphical user interface of a web browser. Optionally, in order for a user action to be considered a click, it can also be required that the user's viewing of the resource be for a minimum threshold length of time.

If the system has access to data that classifies resources into types, the threshold can optionally depend on the type of the resource, the length of the resource, measured in time for a media resource or words for a text resource, or both. A resource type is a classification of a resource based on the type of content included in the resource. Resource types can include, e.g., image resources, media resources, text resources, and so on. For example, the threshold length can be longer for media, e.g., video, than for image resources.

Additionally, in order to account for users that click on a search result and do not return to the search results web page, the duration measured for any given click can be capped at a pre-determined maximum value. The predetermined maximum value can be, e.g., five minutes, ten minutes, twenty minutes, thirty minutes, or one hour. Optionally, if the system has access to the data that classifies resources into types, the predetermined maximum value can depend on the type of resource. For example, the maximum value can be longer for video than for image resources.

Although the user action with respect to a search result is referred to by this specification as a "click," the action can also be a voice-based selection, or a selection by a user's finger on a presence-sensitive input mechanism, e.g., a touchscreen device, or any other appropriate selection mechanism.

In place of or in addition to the data that identifies user clicks on search results, the visit data can also include data obtained from one or more other sources. For example, the visit data can include data obtained from user devices, e.g., from application programs, e.g., web browsers, that run on user devices and display web pages, add-ons to the application programs, e.g., web browser toolbars, or both. The visit data can also include, for example, data obtained from network monitoring systems, e.g., routers, proxy servers, firewalls, or other hardware or software systems that are associated with user devices and monitor communications by the user devices over the network 112. As another example, the visit data can include data obtained from publishers or other entities that maintain resources. For example, this data can be obtained from software applications running on web servers that host the resources or from a client-side script, e.g., JavaScript or VBScript code, included in resources maintained by the publishers.

The obtained data characterizes user visits to resources and the durations of those visits. In this data, the duration of a visit can be measured in any of a variety of ways. For example, the duration of a visit can be measured as the time between the time that a user initiates a request for a resource, e.g., by clicking on a link to the resource or entering a resource locator for the resource into an input field provided by an application program running on the user device or an add-on to the application program, and the time that the user initiates another request for another resource. Alternatively, the duration may be measured as, e.g., the time between the time that a resource is fully rendered by the application program and the time that the user initiates another request for another resource.

Figure 2:
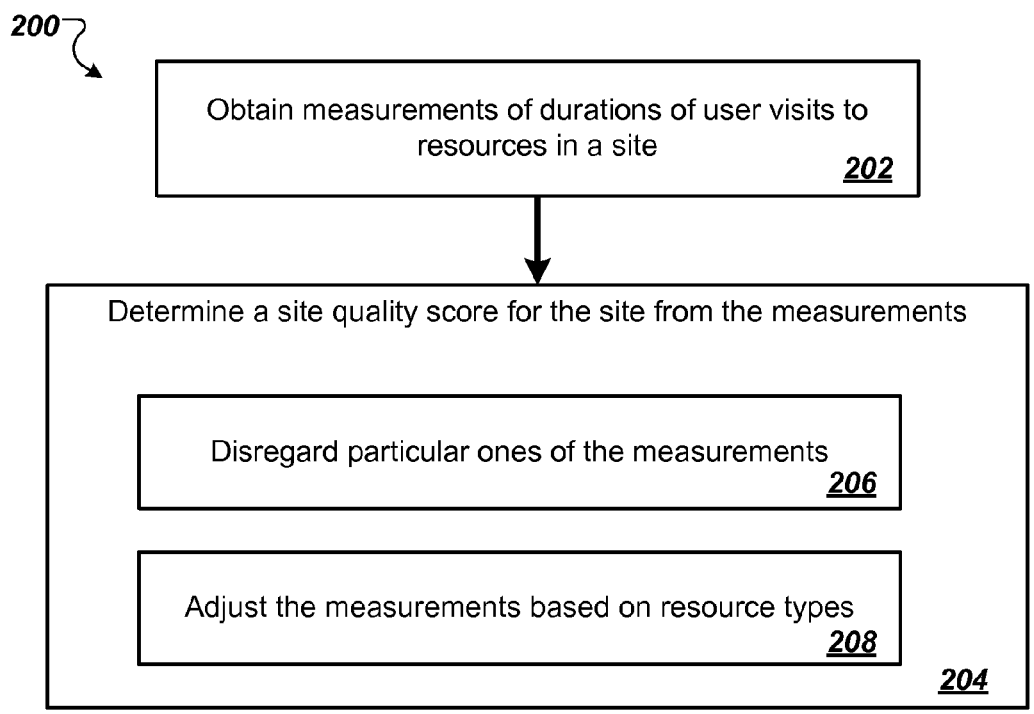
FIG. 2 is a flow diagram of an example process for determining a site quality score.

FIG. 2 is a flow diagram of an example process for determining a site quality score. For convenience, the process 200 will be described as being performed by a system including one or more computing devices. For example, a search system 114, as described in reference to FIG. 1, can be used to perform the process 200.

The system obtains measurements of durations of user visits to resources in a particular site from site data available to the system (step 202). The visits can have occurred over a particular time window, e.g., all visits occurring in the preceding day, two days, week or month, for example, or over all the site data available to the system.

The system determines a site quality score for the particular site from the obtained measurements (step 204). The site quality score can be determined by computing a statistical measure from the obtained measurements. A statistical measure is a value that characterizes a set of data points. For example, the statistical measure can be a measure of central tendency of the measurements, e.g., the arithmetic, geometric, or harmonic mean of the measurements, the median of the measurements, or the mode of the measurements.

The system can alter some of the obtained measurements before calculating the site quality score. For example, if a particular measurement exceeds a pre-determined maximum value, the system can set the measurement equal to the maximum value.

Optionally, the system can disregard particular measurements in the site data when calculating the site quality score (step 206). For example, the system can employ a user model that describes how a user should behave over time, and, if a user's behavior does not conform to this model, the system disregards measurements of the durations of the user's visits. For example, the system can remove measurements originating from cookies or IP addresses that do not look natural in their browsing behavior, e.g., abnormal distribution of click positions, click durations, or clicks per minute/hour/day, from the data set of measurements. Measurements that are the result of suspicious clicks can be removed, and any measurements that resulted from queries that appear to be spammed, e.g., queries for which the clicks feature a distribution of user agents, cookie ages, etc. that do not look normal, can also be disregarded.

Additionally, the system can optionally disregard any measurement that is below a particular threshold time, e.g., to put into effect a judgment that in general a user is unable to ascertain whether a resource contains high-quality or relevant content without viewing the resource for more than the threshold time.

If the system has access to data that classifies resources into types, the system can optionally adjust the measurements for each resource based on the type of the resource before calculating the site quality score, e.g., by multiplying or otherwise adjusting the measurement based on a weight assigned to that resource type (step 208). For example, a user may be able to determine whether an image resource satisfies their informational needs much more rapidly than a media resource, e.g., because the user may need to watch at least a portion of a video to determine the concepts to which the video relates. Because of this, the weight assigned to the media resource type may be greater than the weight assigned to the image resource type. Alternatively, if the data characterizes the site as having a sufficiently large proportion of resources of a particular type, the system can adjust the site quality score for that site by, e.g., multiplying the site quality score for the site by the weight assigned to that particular resource type.

The system can be configured to treat different kinds of collections of resources as a site. For example, the system can treat as a site a collection of resources that are hosted on a particular server. In that case, resources in a site can be accessed through a network, e.g., the Internet, using an Internet address, e.g., a Uniform Resource Locator (URL), corresponding to a server on which the site is hosted. Alternatively or in addition, a site can be defined operationally as the resources in a domain, e.g., "example.com," where the resources in the domain, e.g., "host.example.com/resource1," "www.example.com/folder/resource2," or "example.com/resource3," are in the site. Alternatively or in addition, a site can be defined operationally using a subdomain, e.g., "www.example.com," where the resources in the subdomain, e.g., "www.example.com/resource1" or "www.example.com/folder/resource2," are in the site. Alternatively or in addition, a site can be defined operationally using a subdirectory, e.g., "example.com/subdirectory,", where the resources in the subdirectory, e.g., "example.com/subdirectory/resource.html," are in the site.

While the above description describes determining quality scores for sites, the process 200 of FIG. 2 can also be used to determine a quality score for a single resource from measurements of durations of user visits to the resource.

Site quality scores can be used by a ranking engine to rank search results. For example, the site quality score for a particular site can be used as a term in the computation of scores for resources that are in the particular site. In addition, site quality scores can be used by an indexing engine to determine whether resources in the sites should be indexed, e.g., added to an index database of a search engine. For example, the site quality score for a site can be used in computing a score that determines whether a particular resource on the site is of sufficiently high quality to be added to an index of resources.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining measurements of durations of user visits by multiple users to multiple resources included in a particular site, wherein the particular site is a collection of Internet resources, wherein the collection is those resources that are hosted on a particular server and can be accessed through a network using an Internet address corresponding to the particular server, or the collection is those resources in an Internet domain, or the collection is those resources in an Internet subdomain, or the collection is those resources in a subdirectory or an Internet domain or subdomain, and wherein the measurements comprise, for each of two or more resources in the particular site, measurements of a duration of time that elapsed between a user clicking on a search result link to the resource included in a search results web page and the user navigating back to the search results web page; and determining a site quality score for the particular site based at least in part on the plurality of measurements, wherein determining the site quality score for the particular site comprises computing a statistical measure from the plurality of measurements, and wherein the statistical measure is a measure of central tendency of the plurality of measurements.

2. The method of claim 1, wherein each plurality of measurements comprises measurements obtained from user devices that measure the duration of a visit to a resource in the particular site by a user of the user device.

3. The method of claim 1, wherein each plurality of measurements comprises measurements obtained from a network monitoring system that monitors communications by a user device over a network.

4. The method of claim 1, wherein each plurality of measurements comprises measurements obtained from a server that hosts one or more resources.

5. The method of claim 1, further comprising:
discarding measurements of durations that are below a specified threshold value.

6. The method of claim 1, further comprising:
adjusting measurements that exceed a pre-determined maximum value to be equal to the maximum value.

7. The method of claim 1, wherein determining the site quality score comprises:
obtaining data classifying resources in the particular site into one or more resource types; and
adjusting the measurements for a particular resource classified into a particular resource type based on a weight assigned to the particular resource type.

8. The method of claim 1, wherein determining the site quality score comprises:
obtaining data classifying resources in the particular site into one or more resource types;
determining that a proportion of resources in the particular site that are classified into a particular resource type exceeds a threshold proportion; and
adjusting the site quality score based on a weight assigned to the particular resource type.

9. The method of claim 1, further comprising:
discarding measurements that are classified as suspicious by a user model.

10. A system comprising one or more computers and one or more storage devices storing instructions that, when executed by the one or more computers, cause the one or more computers to perform operations comprising:
obtaining measurements of durations of user visits by multiple users to multiple resources included in a particular site, wherein the particular site is a collection of Internet resources, wherein the collection is those resources that are hosted on a particular server and can be accessed through a network using an Internet address corresponding to the particular server, or the collection is those resources in an Internet domain, or the collection is those resources in an Internet subdomain, or the collection is those resources in a subdirectory or an Internet domain or subdomain, and wherein the measurements comprise, for each of two or more resources in the particular site, measurements of a duration of time that elapsed between a user clicking on a search result link to the resource included in a search results web page and the user navigating back to the search results web page; and determining a site quality score for the particular site based at least in part on the plurality of measurements, wherein determining the site quality score for the particular site comprises computing a statistical measure from the plurality of measurements, and wherein the statistical measure is a measure of central tendency of the plurality measurements.

11. The system of claim 10, wherein each plurality of measurements comprises measurements obtained from user devices that measure the duration of a visit to a resource in the particular site by a user of the user device.

12. The system of claim 10, wherein each plurality of measurements comprises measurements obtained from a network monitoring system that monitors communications by a user device over a network.

13. The system of claim 10, wherein each plurality of measurements comprises measurements obtained from a server that hosts one or more resources.

14. The system of claim 10, the operations further comprising:
discarding measurements of durations that are below a specified threshold value.

15. The system of claim 10, the operations further comprising:
adjusting measurements that exceed a pre-determined maximum value to be equal to the maximum value.

16. The system of claim 10, wherein determining the site quality score comprises:
obtaining data classifying resources in the particular site into one or more resource types; and
adjusting the measurements for a particular resource classified into a particular resource type based on a weight assigned to the particular resource type.

17. The system of claim 10, wherein determining the site quality score comprises:
obtaining data classifying resources in the particular site into one or more resource types;
determining that a proportion of resources in the particular site that are classified into a particular resource type exceeds a threshold proportion; and
adjusting the site quality score based on a weight assigned to the particular resource type.

18. The system of claim 10, the operations further comprising:
discarding measurements that are classified as suspicious by a user model.

19. A non-transitory computer storage medium encoded with a computer program, the program comprising instructions that when executed by one or more computers cause the one or more computers to perform operations comprising:
obtaining measurements of durations of user visits by multiple users to multiple resources included in a particular site, wherein the particular site is a collection of Internet resources, wherein the collection is those resources that are hosted on a particular server and can be accessed through a network using an Internet address corresponding to the particular server, or the collection is those resources in an Internet domain, or the collection is those resources in an Internet subdomain, or the collection is those resources in a subdirectory or an Internet domain or subdomain, and wherein the measurements comprise, for each of two or more resources in the particular site, measurements of a duration of time that elapsed between a user clicking on a search result link to the resource included in a search results web page and the user navigating back to the search results web page; and determining a site quality score for the particular site based at least in part on the plurality of measurements, wherein determining the site quality score for the particular site comprises computing a statistical measure from the plurality of measurements, and wherein the statistical measure is a measure of central tendency of the plurality measurements.

20. The computer storage medium of claim 19, wherein each plurality of measurements comprises measurements obtained from user devices that measure the duration of a visit to a resource in the particular site by a user of the user device.

21. The computer storage medium of claim 19, wherein each plurality of measurements comprises measurements obtained from a network monitoring system that monitors communications by a user device over a network.

22. The computer storage medium of claim 19, wherein each plurality of measurements comprises measurements obtained from a server that hosts one or more resources.

23. The computer storage medium of claim 19, the operations further comprising:
    discarding measurements of durations that are below a specified threshold value.

24. The computer storage medium of claim 19, the operations further comprising:
    adjusting measurements that exceed a pre-determined maximum value to be equal to the maximum value.

25. The computer storage medium of claim 19, wherein determining the site quality score comprises:
    obtaining data classifying resources in the particular site into one or more resource types; and
    adjusting the measurements for a particular resource classified into a particular resource type based on a weight assigned to the particular resource type.

26. The computer storage medium of claim 19, wherein determining the site quality score comprises:
    obtaining data classifying resources in the particular site into one or more resource types;
    determining that a proportion of resources in the particular site that are classified into a particular resource type exceeds a threshold proportion; and
    adjusting the site quality score based on a weight assigned to the particular resource type.

27. The computer storage medium of claim 19, the operations further comprising:
    discarding measurements that are classified as suspicious by a user model.

* * * * *